US 7,766,527 B2

(12) United States Patent
Gingrich, III

(10) Patent No.: US 7,766,527 B2
(45) Date of Patent: Aug. 3, 2010

(54) LOW POWER LED LIGHT ENGINE FOR LIGHT GUIDE

(75) Inventor: Charles Raymond Gingrich, III, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 246 days.

(21) Appl. No.: 12/123,591

(22) Filed: May 20, 2008

(65) Prior Publication Data
US 2009/0290375 A1    Nov. 26, 2009

(51) Int. Cl.
*F21V 8/00* (2006.01)
*B60Q 3/00* (2006.01)
(52) U.S. Cl. .................... 362/555; 362/551; 362/580
(58) Field of Classification Search ............. 362/555, 362/551, 580, 581, 558, 612, 800, 632–634, 362/26, 373, 294; 385/123, 901
See application file for complete search history.

(56) References Cited

U.S. PATENT DOCUMENTS

| 5,987,199 | A | 11/1999 | Zarian et al. |
| 6,095,673 | A | 8/2000 | Goto et al. |
| 6,278,827 | B1 | 8/2001 | Sugiyama et al. |
| 6,488,397 | B1 | 12/2002 | Masutani et al. |
| 6,545,732 | B2 | 4/2003 | Nakano |
| 6,769,799 | B2 | 8/2004 | Goto et al. |
| 6,786,626 | B2 | 9/2004 | Wu et al. |
| 6,826,336 | B2 | 11/2004 | Guy |
| 6,883,949 | B2 * | 4/2005 | Goto et al. .................. 362/551 |
| 6,910,795 | B2 | 6/2005 | Luca et al. |
| 6,966,664 | B2 * | 11/2005 | Wu .............................. 362/610 |
| 7,082,721 | B2 | 8/2006 | Whitehead |
| 7,134,773 | B2 | 11/2006 | Tufte |
| 7,140,762 | B2 | 11/2006 | Wu et al. |
| 7,163,326 | B2 | 1/2007 | Cassarly et al. |
| 7,217,023 | B2 | 5/2007 | Iwasa et al. |

(Continued)

OTHER PUBLICATIONS

ZXLD1350 350mA LED Driver With Internal Switch, Zetex Semiconductors, Apr. 2007, pp. 1-24, Issue 6.

(Continued)

Primary Examiner—Bao Q Truong

(57) ABSTRACT

A light engine assembly that includes a LED having a standard preselected output. The light engine assembly accepts a light guide into the assembly. The assembly includes a two-sided PCB, one side of which is a heat sink to reduce heat build-up on the board and the other side of which is a circuit that provides power to a LED positioned on the board. The circuit includes a connector for connection to a power supply and circuitry that regulates the current supplied to the LED, which is housed on the PCB. The assembly further includes a housing for the PCB that carries the PCB while protecting it from damage. The housing permits ventilation for cooling the board. The housing also includes a light guide holder barrel, which has a substantially square cross-section and is open at one end. The light guide holder barrel accepts a light guide having a substantially circular cross-section, the light guide contacting the light guide holder barrel in four positions, the light guide transmitting light from the LED when the LED is energized. The light guide can be rotated in any position and inserted into the light guide holder barrel to allow light to be transmitted in any preselected direction by the user.

18 Claims, 4 Drawing Sheets

U.S. PATENT DOCUMENTS

| | | |
|---|---|---|
| 7,226,112 B2 | 6/2007 | Ward |
| 7,228,052 B1 | 6/2007 | Lin |
| 2002/0075668 A1 | 6/2002 | Dorrie |
| 2005/0270794 A1 | 12/2005 | Okamoto et al. |
| 2006/0221638 A1 | 10/2006 | Chew et al. |
| 2007/0230163 A1 | 10/2007 | Andrieu et al. |
| 2008/0003867 A1 | 1/2008 | Wu |
| 2008/0192177 A1* | 8/2008 | Lin et al. ............ 349/65 |

OTHER PUBLICATIONS

Zetex, ZXLD1350 350mA LED Driver With Internal Switch, pp. 1-3, http://www.zetex.com/3.0/product_portfolio.asp?pno=zxld1350 (as of May 5, 2008).

International Search Report, International Application No. PCT/2009/003134, International Filing Date May 20, 2009.

* cited by examiner

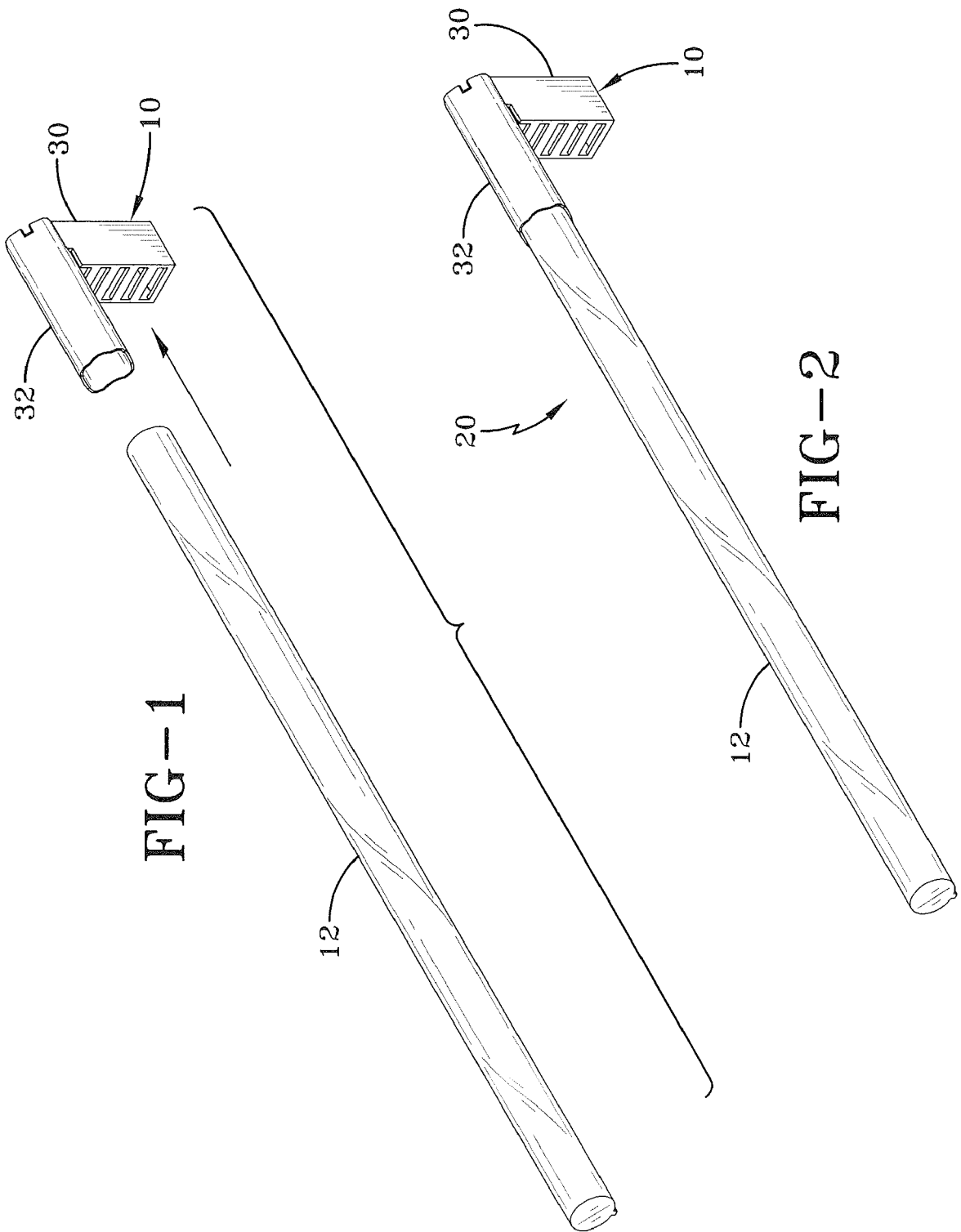

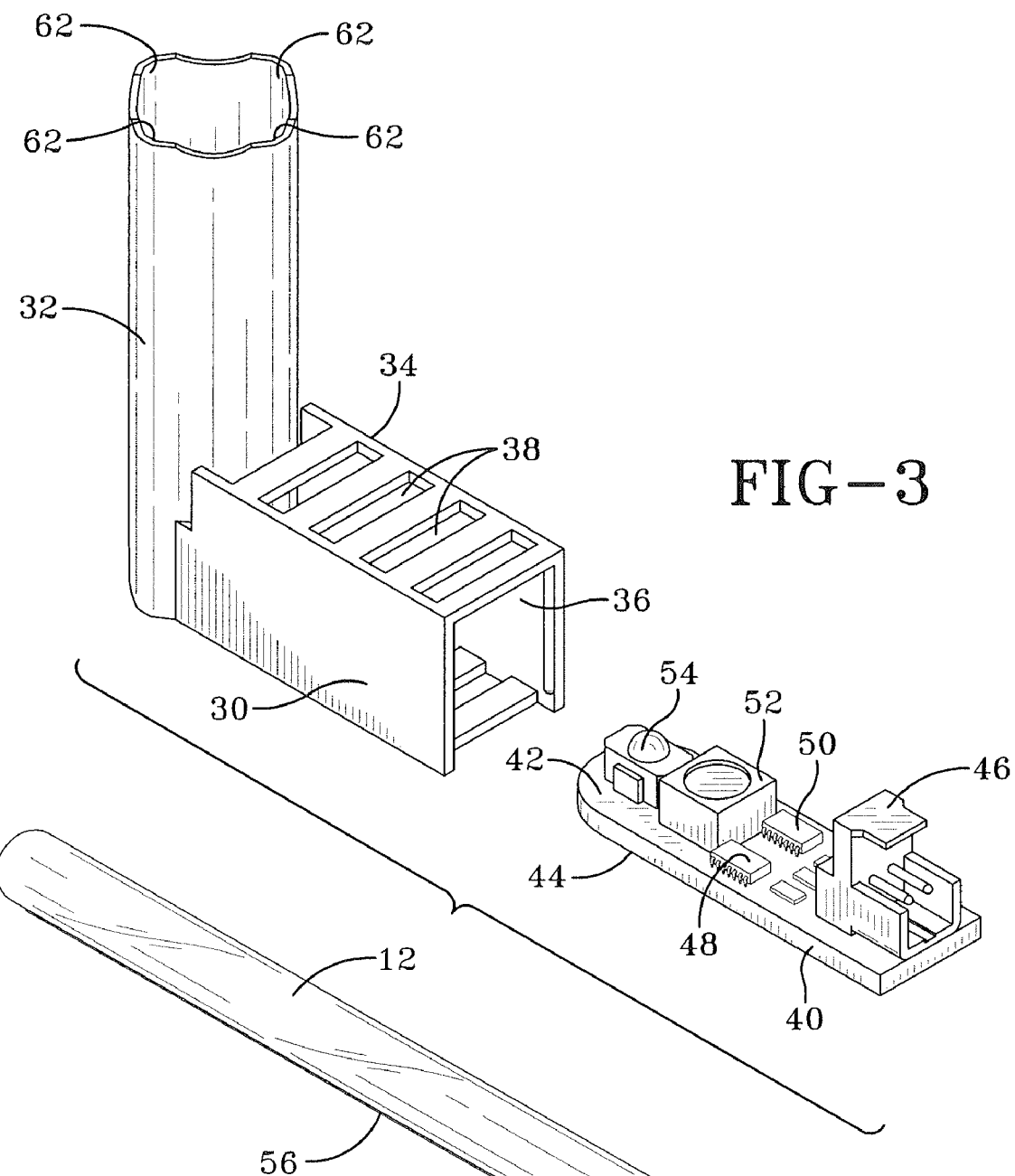

LOW POWER LED LIGHT ENGINE FOR LIGHT GUIDE

FIELD OF THE INVENTION

The present invention is directed to a light emitting diode (LED) for use with a light guide. More particularly, this invention relates to a LED light engine assembly for use in multiple applications.

BACKGROUND OF THE INVENTION

Most LED light engines used with light guides are custom-designed assemblies for each specific application. These custom-designed assemblies are not uniform and may use various designs to achieve the current to drive the LED. Because the input voltage may vary widely, these custom-designed units may utilize inefficient dropping resistors to achieve the required current to drive the LED. Since these assemblies are custom-designed, different assemblies must be available for use with different voltages. This can result in the need to build and stock a number of various custom assemblies to account for different voltages. Alternatively, a constant current drive may be used to power the LED light engine assembly, but this constant current drive is separate from the LED light engine assembly. The electronics associated with both alternatives result in heat generation that must be dissipated in order to prevent overheating.

What is needed is a light engine assembly for use with light pipes that can be used across a wide range of low voltages, yet provides a constant current drive. The assembly should provide a wide range of applicability to minimize the need to stock different units.

SUMMARY OF THE INVENTION

The present invention provides a low power light engine assembly that includes a LED having a standard output. The standard light engine assembly is configured to accept a light guide to allow the light from the LED to be selectively transmitted directionally, in a direction selected by the user.

The assembly includes a two-sided printed circuit board (PCB), one side of which is a heat sink to reduce heat build-up on the board. The other side of the PCB includes a circuit that provides power to a LED positioned on the board when connected to a power source. The circuit includes a connector that connects the board to the power source, and circuitry that regulates the current supplied to the LED, which is housed on the PCB. The assembly further includes a housing for the circuit board that protects the board from damage. The circuit board is carried within the housing, but air is permitted to circulate over and around the circuit board to prevent heat buildup within the housing. The housing also includes a light guide holder barrel, which has a substantially square cross-section and is open at one end. When the circuit board is inserted into the housing, the circuit board extends across the light guide holder barrel so that the LED resides in the barrel light guide holder. The barrel light guide holder is sized to accept a light guide having a substantially circular cross-section, the light guide contacting the light guide holder barrel in four positions and holding it by friction, the light guide transmitting light from the LED when the LED is energized.

An advantage of the present invention is that the circuitry permits the use of the device with direct current ranging from 7-27 volts DC (7-27 VDC), and with minor modifications, at 5 VDC and lower. This allows the light engine assembly of the present invention to be used across a broad range of applications while producing a constant preselected current, thereby eliminating the need to stock a wide variety of different assemblies for different voltage applications.

The low power LED light engine assembly of the present invention allows a cylindrical light guide, when installed, to be oriented in at least four positions oriented 90° apart, and, depending on the design of the light guide, at any position about its 360° circumference. The cylindrical light guide is held in position in the light guide holder barrel as a result of a frictional interface between the square cross-section of the light guide holder barrel and the substantially cylindrical light guide, which contacts the light guide at four positions along the circumference of the light guide. This provides an additional advantage of reducing contact between the light guide and the barrel walls, since reduced contact results in reduced light loss, and hence increased light intensity Further, by fabricating the light guide holder barrel from a compliant material, the barrel walls can flex to accept light guides having a variable diameter that is slightly larger than the distance between the sides of the barrel walls.

The present invention also provides a housing that supports the PCB while also protecting it from damage during handling and during use. The housing further provides sufficient air circulation or ventilation to prevent heat accumulation and allows for the removal of heat from the PCB.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 depicts an exploded view of the low power LED light engine assembly and light guide of the present invention.

FIG. 2 depicts a light guide assembled into the light guide holder barrel of the low power LED light engine assembly.

FIG. 3 is an exploded view of the low power LED light engine assembly 10.

FIG. 5 is a view of the light guide assembled into the light guide holder barrel of the low power LED light engine assembly from the underside of the assembly housing.

DETAILED DESCRIPTION OF THE INVENTION

Figure 4:
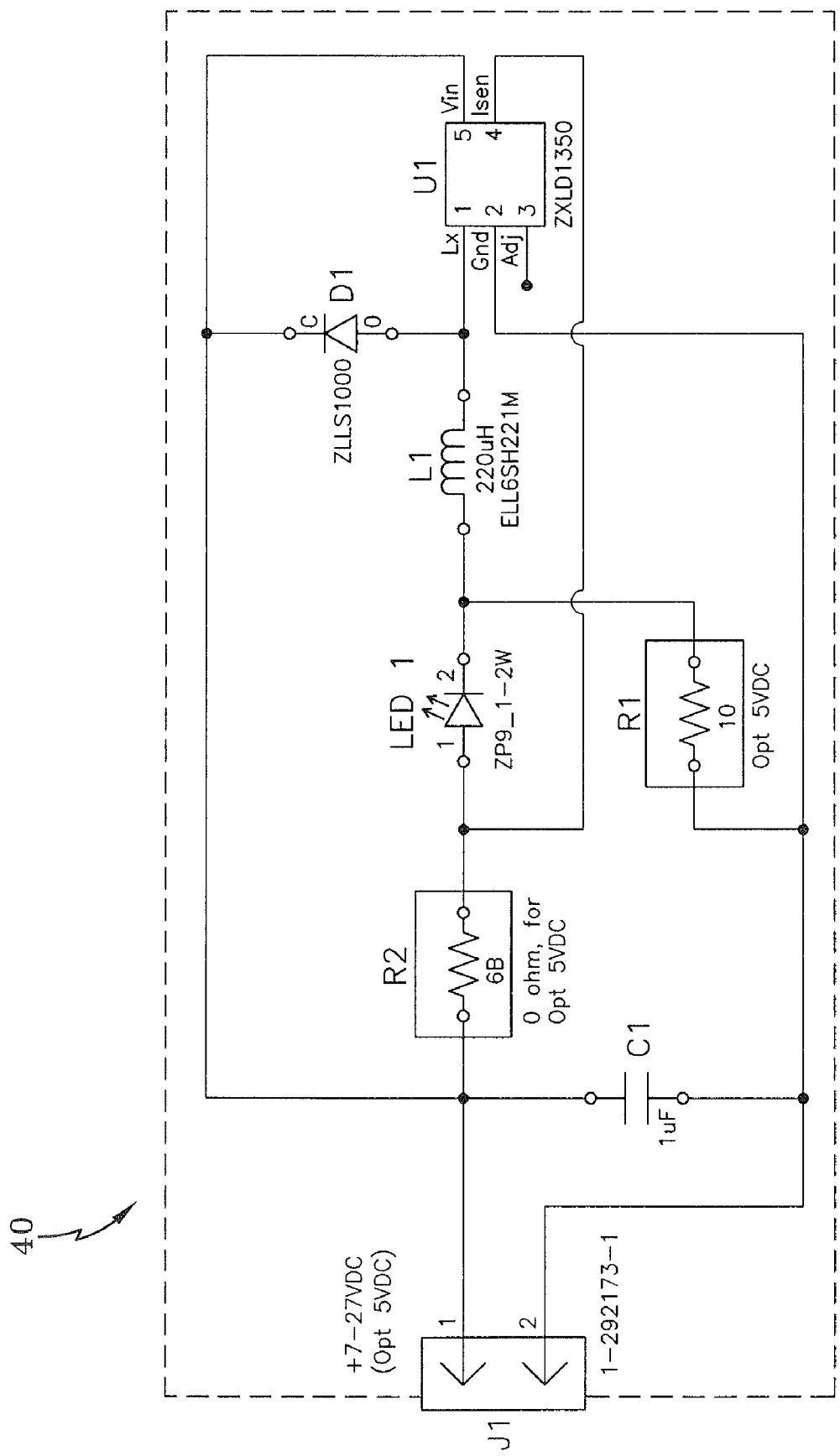
FIG. 4 is an electrical schematic of the printed circuit board with the electrical components installed thereon.

A low power LED light engine assembly 10 and light guide 12 are depicted in FIG. 1. The low power LED light engine assembly 10 and light guide assembly 20, which includes light guide 12 assembled into a light guide holder barrel 32 of a housing 30 of low power LED light engine assembly 10 is depicted in FIG. 2.

FIG. 3 depicts an exploded view of low power LED light engine assembly 10. Low power LED light engine assembly 10 includes housing 30 and a printed circuit board 40, printed circuit board 40 being assembled into housing 30. Housing 30 includes a light guide holder barrel 32 and a board housing portion 34. Preferably, housing 30 is molded as a single piece thermoplastic. Board housing portion 34 as shown has a hollow interior 36 that accepts board 40. Board housing portion 34 also includes optional ventilation, depicted as slots 38 in FIG. 3. The purpose of the ventilation, slots 38, is to permit circulation of air into the hollow interior of the housing to provide cooling to printed circuit board 40 and components mounted thereon. While slots 38 are shown, any other arrangement that allows for air circulation, such as perforations, while providing protection for board 40 may be used. Light guide holder barrel 32 has a substantially square cross-section, and preferably is compliant. Compliant barrel 32 accommodates light guides having a wide tolerance band, yet can hold light guides by providing a friction fit at four locations across the diameter of light guide 12 where light guide contacts the sides of compliant light guide holder barrel 32.

Printed circuit board 40 is a two-sided board, a first side 42 being populated with various electronic components mounted thereon in electrical communication. The second or opposite side 44 of board 40 may be provided as a heat sink. Preferably, the heat sink is a thermally conductive metal. Board 40 includes a connector 46 for providing power to the board. Power can be from any source, but typically is from a direct current (DC) source. A preferred connector 46 is a common terminal (CT) connector available from Tyco Electronics, Fulling Mill Road, Middletown, Pa.

In an embodiment depicted in FIG. 3, the electrical components mounted on the first side include a control device 48 that provides a constant operating current from an input voltage below about 27 volts direct current (VDC), but preferably is in the range of about 7-27 VDC. A preferred control device 48 is a chip available from ZETEX of Chadderton, Oldham, United Kingdom, having offices in Hauppauge, N.Y., and identified as ZXLD 1150 LED driver that provides a constant current of about 150 millamperes (mA). Printed circuit board 40 also includes a power inductor 52 to further assist in regulating the flow of current to a LED 54. These components provide a constant current output regardless of the voltage and voltage drop. LED 54 is mounted on printed circuit board 40 and may be any size. However, for most applications, a ½ watt LED provides sufficient light. The current supplied to power this light is regulated preferably at about 150 milliamperes, which is constant and permits the operation of a ½ watt LED even when the voltage may be fluctuating. It will be recognized by those skilled in the art that low power LED light engine 10 can be reconfigured with a LED 54 having a higher or a lower light output. This would require selecting a LED 54 having an appropriate wattage and reconfiguration of control device 48 and possibly power inductor 52, but this is readily within the skill of the art. FIG. 4 depicts an electrical diagram of this embodiment, showing two optional embodiments of the circuitry, one for very low voltage applications (5 VDC lower), and one for higher voltage applications (7-27 VDC).

In a second embodiment of the present invention, an optional resistor 50 is substituted for control device 48 and power inductor 52. In this embodiment, which is a low cost alternative for use at low voltages, below 7 VDC and preferably at about 5 VDC, the voltage input may vary slightly, causing the current to vary. Variations in current lead to variations in LED intensity, as LED intensity is proportional to the current. This low cost alternative, resulting from the elimination of high cost components from the circuit board, is acceptable to users that are not concerned with LED intensity variations.

On insertion of printed circuit board 40 into hollow interior 36 of housing 30, LED 54 is positioned within light guide holder barrel 32 and light guide 12 is inserted into light guide holder barrel 32 of housing 30. Preferably LED 54 will be centered in light guide holder barrel 32 when the printed circuit board is fully inserted into housing 30. As the cross-section of barrel 32 is substantially square, and the diameter of light guide 12 is the same size or slightly larger than the perpendicular distance across the square walls of barrel 32, barrel 32 preferably being made of a compliant material or having an interior of a compliant material, light guide 12 is held in place by frictional contact with the walls of barrel 32 when inserted into light guide holder barrel 32. Importantly, because the barrel configuration has a square cross-section, the interference fit results in contact between barrel 32 and light guide 12 substantially along four longitudinal lines positioned about 90° apart and along the outer circumference of light guide 12, which lines correspond to the midpoint of the each side of the barrel walls. This minimal contact is desirable since increased contact between a light guide holder, such as barrel 32, and a light guide undesirably results in light loss and reduced light intensity of any resultant beam. It will be recognized by those skilled in the art that the light provided by the light engine of the present invention can be provided as desired such as by providing LED's in the desired colors. Optionally, or in combination, the light guides can be provided with various color tints, so that virtually any color can be achieved.

Figure 6A:
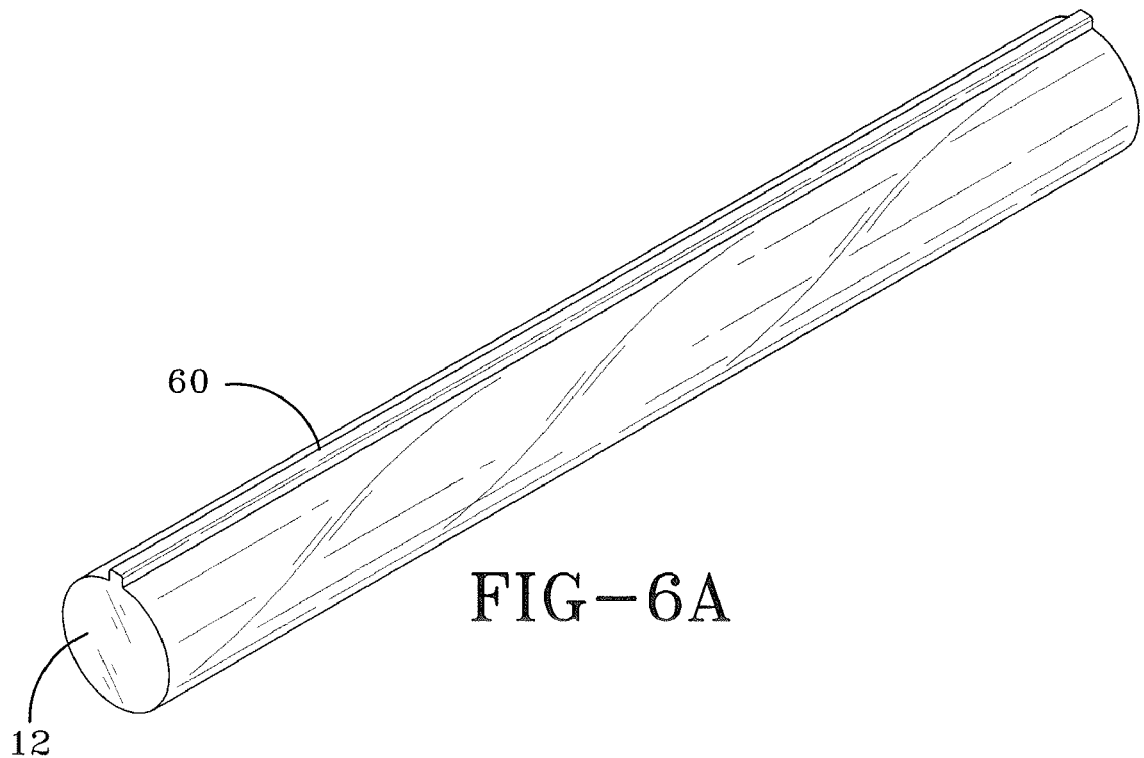
FIG. 6 is a view of the light guide of the present invention in perspective, FIG. 6A, in cross-section, FIG. 6B and a detail, FIG. 6C.
Figure 6B:
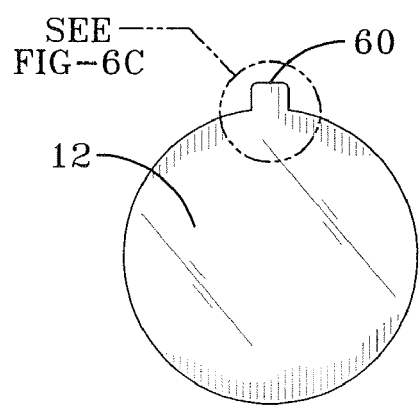
Figure 6C:
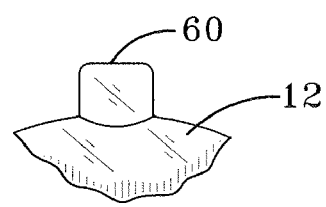

Referring again to FIG. 2, which depicts light guide 12, a clear plastic, glass or other transparent material, assembled into light guide holder barrel 32 of low power LED light engine assembly 10, and to FIG. 5, which is a view of light guide 12 assembled into the light guide holder barrel 32 of low power LED light engine assembly 10 from the underside of the assembly housing 30, it can be seen that light guide 12 includes a reflector strip 56. When powered, light from LED 54 propagates along light guide 12. Reflector strip 56 provides directionality to the light, directionally reflecting light from light guide 12 in a radial direction and opposite reflector strip 56. Reflector strip 56 can be as simple as white ink or other reflective material, such as a reflective metal, applied longitudinally along a portion of the outer circumference of light guide 12 and optionally at the end of the light guide to prevent light loss from the end of light guide 12. Preferably, light guide 12 is co-extruded and includes a white plastic material insert 60 as depicted in FIGS. 6A, 6B and 6C, which depict a perspective view of a co-extruded light guide 12, along with a side view and a detail of the insert.

As can be seen from FIG. 6, light guide 12 has a cross-section of predetermined radius, and the reflector strip is a reflective insert extending axially along a portion of the outer circumference of the light guide parallel to a central axis of light guide 12. The reflective insert 60 has an outer portion that is located at a radial distance from the central axis of light guide 12 greater than the predetermined radius of the light guide. Although the insert is co-extruded in this preferred embodiment, a reflector strip 56 may be applied to a light guide by any other method. Reflector strip 56 provides directionality to the light propagating along the light guide.

In a preferred embodiment of light guide 12, when reflector strip 56 uses co-extruded material insert 60, the substantially square light guide holder barrel 32 includes corners 62 that are configured to accept the insert. In this preferred embodiment, the preferred light guide is an Amp Light Guide™, available from Tyco Electronics, Middletown, Pa., that is a clear acrylic co-extruded with a white acrylic reflector strip 60. Reflector strip 60 scatters light as it travels down light guide 12 so the light exits light guide 12 in a radial direction from the side of the cylindrical light guide 12 opposite reflector strip 60. The light pattern is therefore a linear light output along the length of light guide 12, that is a controlled light loss from the light guide. The co-extruded white acrylic strip 60, depicted in FIG. 6, slides into corners 62. Since it is extruded outside the circular envelope of light guide 12, it provides a locating feature with features of corners 62 of barrel 32. While this limits the location of light guide within barrel 32 to one of four different orthogonal positions, it assures an accurate placement of the reflector strip to control the desired light output direction and also serves to prevent inadvertent rotation of light guide 12. In the preferred embodiment directing the light in a predetermined direction does not require great skill in determining proper alignment, since the interface of insert 60 into one of four corners 62 sets the proper alignment.

When powered, printed circuit board 40 and the components mounted thereon generate heat. However, this heat is removed by operation of a metallic heat sink on the second side 44 of board. Slots 38 facilitate air flow around both the heat sink located on second side 44 of board 40 and over the components mounted on first side 42 of board 40, which permits heat transfer by conduction and convection, moving heat away from both sides of board 40 to prevent overheating.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A low power LED light engine assembly, comprising
a housing, the housing having a hollow interior;
a two-sided printed circuit board, one side of the board including an electrical circuit, the circuit board inserted in the hollow interior of the housing that provides protection of the circuit board, the circuit further including
   a connector for providing power from a power source,
   a LED, and
   circuitry that regulates electrical current supplied to the LED;
the housing further including a light guide holder barrel, the light guide holder barrel having a square cross-section, the square cross-section sized to hold a substantially circular light guide in a preselected position; and
wherein the LED is in optical communication with the light guide holder barrel when the printed circuit board is inserted into the hollow interior of the housing.

2. The low power LED light engine assembly of claim 1 wherein the housing further includes openings to provide ventilation to the hollow interior and remove heat from the printed circuit board.

3. The low power LED light engine assembly of claim 2 wherein the openings include slots in the housing.

4. The low power LED light engine assembly of claim 1 wherein the light guide holder barrel of the housing further includes corners configured to accept an insert of a light guide.

5. The low power LED light engine assembly of claim 1 wherein the circuitry includes a control device and a power inductor that provides a substantially constant current to the LED.

6. The low power LED light engine assembly of claim 1 wherein the circuitry includes a resistor that provides a current to the LED.

7. A low power LED light engine and light guide assembly, comprising
a housing, the housing having a hollow interior;
a two-sided printed circuit board, one side of the board including an electrical circuit, the circuit board inserted in the hollow interior of the housing that provides protection of the circuit board, the circuit further including
   a connector for providing power from a power source,
   a LED, and
   circuitry that regulates electrical current supplied to the LED;
the housing further including a light guide holder barrel, the light guide holder barrel having sides providing a square cross-section, the square cross-section sized to hold a substantially circular light guide in a preselected position;
a light guide having a substantially circular cross-section, the light guide sized to be received by the light guide holder barrel in a preselected position and held in the preselected position by contact along midpoints of the walls of the light guide barrel holder, the light guide further including a reflector strip; and
wherein the LED is in optical communication with the light guide barrel holder when the printed circuit board is inserted into the hollow interior of the housing.

8. The low power LED light engine and light guide assembly of claim 7 further including a power source providing a preselected range of voltage through the connector to the printed circuit board, and the circuitry supplies current at a constant amperage to the LED.

9. The low power LED light engine and light guide assembly of claim 7 wherein the light guide has a cross-section of predetermined radius and the reflector strip is a reflective insert extending axially along a portion of the outer circumference of the light guide parallel to a central axis of the light guide, an outer portion of the reflective insert being located at a radial distance from the central axis greater than the predetermined radius of the light guide.

10. The low power LED light engine and light guide assembly of claim 9 wherein the light guide holder barrel of the housing includes corners configured to accept the reflective insert.

11. The low power LED light engine and light guide assembly of claim 10 wherein the light guide is assembled into the light guide holder barrel so that the reflective insert of the light guide is assembled into one of the corners of the barrel.

12. The low power LED light engine and light guide assembly of claim 9 wherein the light guide is assembled into the light guide holder barrel in one of four predetermined positions, the four positions being orthogonal with respect to one another.

13. The low power LED light engine and light guide assembly of claim 8 wherein the preselected voltage is below 27 VDC.

14. The low power LED light engine assembly of claim 13 wherein the circuitry includes a control device and a power inductor that provides a substantially constant current to the LED when the preselected voltage varies from about 7-27 VDC.

15. The low power LED light engine assembly of claim 13 wherein the circuitry includes a resistor that provides a current to the LED when the preselected voltage is below about 7 VDC.

16. The low power LED light engine assembly of claim 7 wherein the housing is formed as a single piece of thermoplastic material.

17. The low power LED light engine assembly of claim 16 wherein the thermoplastic material is a compliant material.

18. The low power LED light engine assembly of claim 7 wherein the light guide holder barrel is formed of a compliant material.

* * * * *